US012803188B2

(12) United States Patent
Egger et al.

(10) Patent No.: US 12,803,188 B2
(45) Date of Patent: Nov. 17, 2026

(54) ELECTRICAL CONNECTION ARRANGEMENT, CONNECTION SYSTEM AND METHOD FOR PRODUCING AN ELECTRICAL CONNECTION BETWEEN TWO ELECTRICAL CONDUCTORS

(71) Applicant: Rosenberger Hochfrequenztechnik Gmbh & Co. KG, Fridolfing (DE)

(72) Inventors: Tobias Egger, Fridolfing (DE); Maximilian Rolshausen, Traunstain (DE); Johann Gottanka, Marktl (DE)

(73) Assignee: Rosenberger Hochfrequenztechnik GmbH & Co. KG, Fridolfing (DE)

(*) Notice: Subject to any disclaimer, the term of this patent is extended or adjusted under 35 U.S.C. 154(b) by 329 days.

(21) Appl. No.: 18/142,349

(22) Filed: May 2, 2023

(65) Prior Publication Data

US 2023/0361491 A1 Nov. 9, 2023

(30) Foreign Application Priority Data

May 6, 2022 (EP) .................................... 22172047

(51) Int. Cl.
*H01R 4/30* (2006.01)

(52) U.S. Cl.
CPC ..................................... *H01R 4/30* (2013.01)

(58) Field of Classification Search
CPC ... H01R 4/30; H01R 4/34; H01R 4/06; H01R 4/44; H01R 4/5025; H01R 4/5091; H01R 4/64; H01R 13/748

(Continued)

(56) References Cited

U.S. PATENT DOCUMENTS 1,978,935 A * 10/1934 Douglas .................. F16B 29/00 411/80.2
11,616,311 B1 * 3/2023 Wei .......................... H01R 4/30 439/810

(Continued)

FOREIGN PATENT DOCUMENTS

DE 19847361 A1 5/2000
EP 1376766 A1 1/2004

(Continued)

OTHER PUBLICATIONS

European Search Report dated Oct. 28, 2022.

*Primary Examiner* — Christopher M Koehler
*Assistant Examiner* — Gregory L Mangot
(74) *Attorney, Agent, or Firm* — Randall Danskin P.S.

(57) ABSTRACT

An electrical connection arrangement for electrical and mechanical connection of a first electrical conductor to a second electrical conductor, comprising: an electrical connection element, having, a press portion, a bearing portion having a bearing surface, and a connection bore extending between the press portion and the bearing portion, and the press portion has a lateral contact surface for electrical contact with a contact recess defined in the first electrical conductor, and the bearing surface contacts the second electrical conductor; and a first fastening means and a second fastening means both extend at least partially through the connection bore and are connectable with one another; and the press portion is enlarged responsive to the connection of the second fastening means with the first fastening means and a mechanical interface rotationally fixes connection of the electrical connection element to the first electrical conductor, or to the second electrical conductor.

15 Claims, 7 Drawing Sheets

(58) Field of Classification Search
USPC .......................................................... 439/577
See application file for complete search history.

(56) References Cited

U.S. PATENT DOCUMENTS

| | | | | |
|---|---|---|---|---|
| 2015/0244134 | A1 | 8/2015 | Cumant | |
| 2016/0261066 | A1 | 9/2016 | Müller | |
| 2021/0355982 | A1 | 11/2021 | Cao | |
| 2024/0170862 | A1* | 5/2024 | Dahmer | H01M 50/517 |

FOREIGN PATENT DOCUMENTS

| | | | |
|---|---|---|---|
| EP | 3128617 | A1 | 2/2017 |
| GB | 214139 | A | 4/1924 |
| JP | 2000077111 | A | 3/2000 |
| WO | 2007046720 | A2 | 4/2007 |

* cited by examiner

ELECTRICAL CONNECTION ARRANGEMENT, CONNECTION SYSTEM AND METHOD FOR PRODUCING AN ELECTRICAL CONNECTION BETWEEN TWO ELECTRICAL CONDUCTORS

CROSS-REFERENCE TO RELATED APPLICATIONS

This US National Stage Non-Provisional Patent application claims priority to earlier filed European Patent Application No. 22 172 047.7 which was filed on 6 May 2022. The entire contents of the aforementioned earlier filed European Patent Application is expressly and fully incorporated herein by this reference.

Pursuant to USPTO rules, this priority claim to earlier file European Patent Application No. 22 172 047.7 which was filed on 6 May 2022 is also included in the Application Data Sheet (ADS) filed herewith.

FIELD OF INVENTION

The invention relates to an electrical connection arrangement for the electrical and mechanical connection of a first electrical conductor to a second electrical conductor, the electrical connection arrangement having an electrical connection element with a press portion which is arranged on a first end, and which has at least one lateral contact surface for electrical contact with an inner lateral surface of a contact recess of the first electrical conductor, and with a bearing portion which is arranged on a second end and which has a bearing surface for a non-positive connection to a side surface of the second electrical conductor.

The invention further relates to an electrical connection system, in particular an electrical connection system for high voltage technology, and a method for producing an electrical and mechanical connection between a first electrical conductor and a second electrical conductor.

BACKGROUND OF THE INVENTION

In many applications it is necessary to connect together two or more electrical conductors. To this end, a rigid mechanical connection between the electrical conductors is sometimes advantageous, in particular if the electrical conductors are also rigid components, such as for example in conductor rails in high voltage technology.

When connecting two electrical conductors, in particular rigid electrical conductors, often tolerances have to be considered in the spatial position (position and/or orientation) between the electrical conductors or the Interfaces thereof or the portions to be connected. In vehicle technology, for example, conductor rails to be connected are generally fastened to different components (for example a first conductor rail to the body of the vehicle and a second conductor rail to an energy store or electrical consumer). The tolerances can thus be relatively large, in particular the spacing and orientation of the electrical conductors to one another.

Particular requirements are set for the connection of electrical conductors, in particular in the high voltage range. High voltage connection arrangements are primarily used in electric and/or hybrid vehicles in the automotive sector, in order to supply a vehicle battery with charging current or in order to remove the stored energy from the battery and to supply it to the electrical drive or other electrical consumers. The connection arrangement has to ensure a perfect transmission of high currents preferably with low transfer impedance. With the danger which might occur with a malfunction of components in an electric vehicle, particularly high requirements have to be set for the quality of the conductors and components of the connection arrangement. Thus at times an electrical connection arrangement has to withstand high mechanical loads, so that the electrical connection is not inadvertently disconnected, for example during the operation of the vehicle.

At the same time, however, a simple or convenient and safe assembly of the connection arrangement generally also has to be taken into account.

In view of the known prior art, an object of the present invention is to provide an electrical connection arrangement which makes it possible to compensate for a variable spacing between the electrical conductors to be connected, preferably with ease of assembly and a robust design.

An object of the present invention is also to provide an electrical connection system in which it is possible to compensate for a variable spacing between the electrical conductors to be connected, preferably with ease of assembly and a robust design of the relevant connection arrangement.

It is a further object of the invention to provide a method for producing an electrical and mechanical connection between electrical conductors with the possibility of compensating for a variable spacing between the electrical conductors, preferably with ease of implementation.

An electrical connection arrangement is provided for the electrical and mechanical connection of a first electrical conductor to a second electrical conductor.

Preferably, the electrical connection arrangement is configured for use in high voltage technology, in particular in vehicle technology, for example in electromobility.

The electrical connection arrangement thus is preferably suitable for transmitting high electrical currents at high electrical voltages. The connection arrangement, in particular the connection element also mentioned hereinafter, can be configured for example for transmitting electrical currents of up to 100 amperes, up to 200 amperes, up to 300 amperes, up to 400 amperes, up to 500 amperes, up to 600 amperes, up to 2000 amperes or more, preferably with high electrical voltages (for example up to 500 volts, up to 600 volts, up to 700 volts, up to 800 volts, up to 900 volts, up to 1000 volts, up to 1100 volts, up to 1500 volts, up to 2000 volts or more).

The conductor cross section of the at least one electrical conductor and/or the cross-sectional extent of the connection element can be, for example, up to 10 $mm^2$, preferably up to 30 $mm^2$, particularly preferably up to 60 $mm^2$, even further preferably up to 90 $mm^2$, for example also up to 200 $mm^2$, or more. In particular, it is possible to provide a line cross-section or a cross-sectional extent of the connection element which is suitable for transmitting electrical energy in high voltage technology, i.e. for transmitting high electrical currents (for example 100 amperes, up to 2000 amperes) with alternating voltages of 30 volts to 1000 volts or more, or direct voltages of 60 volts to 2000 volts or more, in particular in vehicle technology.

The electrical connection arrangement has an electrical connection element. This connection element comprises a press portion arranged on a first end. The press portion has at least one lateral contact surface for electrical contact with an inner lateral surface of a contact recess of the first electrical conductor.

The first electrical conductor and the second electrical conductor are not to be understood as components of the claimed connection arrangement. The connection arrangement is advantageously configured, however, to connect together the separate electrical conductors.

A radial or lateral contact within the contact recess (for example a through bore or a blind bore) of the first electrical conductor can be permitted by the press portion. A contact on the front face of the first electrical conductor by the press portion, however, is generally not provided, but optionally possible.

The connection element also comprises a bearing portion which is arranged on a second end which has a bearing surface for a non-positive connection to a side surface of the second electrical conductor.

Preferably, a bearing surface is provided on the front face of the bearing portion in order to come into contact non-positively with the side surface of the second electrical conductor facing the first electrical conductor, in particular in the case of the screw connection to be described hereinafter in more detail, between the two fastening means mentioned hereinafter. It can also be provided, however, that the bearing surface is a surface facing away from the front face of the second end of the electrical connection element, in order to come into contact with the side surface of the second electrical conductor facing away from the first electrical conductor, in particular in the case of the bolt connection to be described in more detail hereinafter, between the two fastening means.

The bearing portion is suitable, in particular, for contact or a direct connection with the second electrical conductor. In principle, however, an indirect connection is also possible, for example via a spacer which is arranged between the bearing surface and the side surface of the second electrical conductor. The connection between the bearing portion or the bearing surface thereof and the second electrical conductor can be a purely mechanical connection, but preferably an electrical connection can also be provided (directly or indirectly) in addition to the mechanical connection. If a purely mechanical connection is provided between the bearing portion and the second electrical conductor, an electrical connection can be produced between the first electrical conductor and the second electrical conductor, preferably via a conductive connection between the two fastening means, which in turn come into contact in each case at least indirectly with one respective electrical conductor.

A radial or lateral contact of the second electrical conductor by means of the bearing portion is generally not provided but optionally possible. In principle, the bearing portion can come into contact with any surface of the second electrical conductor, in particular a side surface, optionally also a front surface. The surfaces of the bearing portion in contact ("bearing surface") and the second electrical conductor are preferably planar or flat but can optionally also run in a curved manner (convex and/or concave)—in the case of a curvature preferably, but not necessarily, with a coinciding radius of curvature, for a contact which is as flat as possible.

In particular, a flat contact can be provided between the (front) bearing surface and the corresponding side surface of the second electrical conductor.

It has been shown that a variable spacing between the electrical conductors can be implemented in a particularly advantageous manner by a combination of axial contact, on the one hand, (in particular contact on the front face) and radial or lateral contact, on the other hand.

Preferably, the electrical connection element has exclusively the aforementioned two ends, i.e. the first end and the second end. It can be provided that the connection element is a primarily elongated body which extends from its first end to its second end along a longitudinal axis or central axis. The connection element can optionally be configured axially symmetrically.

It can be provided that the press portion directly adjoins the bearing portion along the longitudinal axis or along the extent of the electrical connection element from its first end to its second end. Optionally, however, it is possible to provide an intermediate portion axially separating the press portion and the bearing portion.

A connection bore extends at least between the bearing portion and the press portion (preferably the connection bore extends at least from the second end of the electrical connection element through the bearing portion into the press portion and/or from the first end of the electrical connection element through the press portion into the bearing portion) so that the electrical connection element can receive a first fastening means or form such a fastening means itself, and can receive a second fastening means which can be connected to the first fastening means (in particular inside the connection bore). Preferably, the fastening means can be screwed via a common threaded connection or pressed in the manner of a bolt connection.

Preferably, the first fastening means is received or can be received in the press portion or is configured in the press portion.

Preferably, the second fastening means can be received at least in the bearing portion.

Preferably, the connection bore is configured as a through bore which extends entirely through the electrical connection element, i.e. from the first end to the second end. However, the connection bore can optionally also be a blind bore which terminates inside the press portion and/or the bearing portion, so that the first fastening means, for example, is captively received inside the press portion.

The electrical connection element, in particular the press portion, can also form a first fastening means itself or be configured in one piece with the first fastening means. The press portion can, for example, be configured to be slotted and have an internal thread on the inner lateral surface inside the connection bore in order to provide a connection element in the manner of an expansion dowel.

The connection bore can optionally have various shoulders or steps along its longitudinal extent, for example a step or a shoulder between the bearing portion and the press portion, so that the first fastening means and/or the second fastening means can be axially supported. The connection bore can preferably have a smaller cross-sectional extent or a smaller diameter inside the bearing portion than in the press portion, or vice versa.

The connection bore in principle does not have to be configured to be circular, wherein a circular connection bore is preferred, however. In any case a design of the connection bore is also possible in any polygonal shape (for example, and without limitation, three-sided, four-sided, five-sided, six-sided, seven-sided, eight-sided, etc.), a star-shape or other shape, for example also a design as an elongated hole or elliptical recess.

Neither the first fastening means nor the second fastening means necessarily has to be understood to be part of the claimed connection arrangement. The connection arrangement or the electrical connection element can be accordingly configured to cooperate functionally with the fastening means.

Due to the connection bore between the bearing portion and the press portion it is possible to connect, in particular to screw or press, the two fastening means inside the common connection bore. By the possibility of connecting the two fastening means axially, an axial force component can be advantageously introduced into the connection between the electrical conductors, for example when the second fastening means is supported on the side of the second electrical conductor facing away from the first electrical conductor and pulls the electrical connection element together with the first fastening means in the direction of the second electrical conductor, while at the same time the press portion is spread apart/radially enlarged.

The threaded connection (internal thread and external thread) of the fastening means can preferably be a standard threaded connection, for example M2 to M10. The specific design of the threaded connection, however, in principle is not necessarily relevant.

The press portion is able to be radially spread/radially enlarged apart by the first fastening means and/or by the second fastening means in order to bring about a non-positive connection between the at least one lateral contact surface and the inner lateral surface of the contact recess by the two fastening means being connected together (for example screwed or pressed).

By the possibility of spreading apart the press portion, it is possible to produce a connection which is exceptionally robust both mechanically and electrically and which has low impedance between the press portion and the first electrical conductor inside the contact recess. The connection can be reliably produced even when the two electrical conductors are not oriented toward one another ideally in their spatial position, i.e. when for example an axial offset or tilting is present between the two electrical conductors.

By means of the press portion and the possibility of spreading apart/radially enlarging the press portion for the aforementioned non-positive connection, it is possible to produce a press connection between the electrical connection element and the first electrical conductor inside the contact recess, in the manner of a flexible interference fit. The non-positive connection between the press portion and the contact recess can be adjusted conveniently and accurately by a technician, in particular, by screwing together the two fastening means.

The aforementioned non-positive connection between the bearing surface of the bearing portion and the corresponding side surface of the second electrical conductor can also be produced by the proposed connection arrangement. When the two fastening means are screwed together, the bearing portion with its front bearing surface can move in the direction of the second electrical conductor due to the axial movement of the second fastening means, until the front bearing surface and the second electrical conductor bear non-positively against one another. This generally takes place before the press portion is spread apart/radially enlarged.

Overall an advantageous axial non-positive connection can be permitted with the second electrical conductor and a radial non-positive connection Inside the contact recess of the first electrical conductor, with high tolerance compensation and ease of assembly.

It can be provided that the electrical connection element is primarily sleeve-shaped.

In particular, with a sleeve-shaped electrical connection element it can be provided that the connection bore extends entirely through the electrical connection element.

The electrical connection element, in particular a sleeve-shaped electrical connection element, can be introduced in a particularly simple manner in the course of assembly between the electrical conductors. To this end, the electrical connection element can be initially introduced, for example, with its press portion into the contact recess of the first electrical conductor.

A captive pre-assembly of the connection arrangement can be provided, in particular a captive pre-assembly of the electrical connection element, for example inside a housing shell and/or a contact protection element of one of the electrical conductors, in particular the first electrical conductor.

The bearing portion is preferably configured from an electrically conductive material, in particular entirely from an electrically conductive material. Preferably, the press portion is configured from an electrically conductive material, in particular entirely from an electrically conductive material. The bearing portion and/or the press portion can be configured, for example, from metal, for example from copper or aluminum.

In a development of the invention, it can be provided that the bearing portion is configured in one piece with the press portion.

In principle it can be advantageous if the electrical connection element is configured entirely in one piece, but in particular it is at least advantageous to configure the bearing portion and the press portion in one piece. As an alternative to a one-piece design of the bearing portion and the press portion, the bearing portion and the press portion can be fastened to one another (non-positively, by a material connection and/or positively).

Generally, the electrical connection element consists exclusively of the bearing portion and the press portion and has no further components (optionally further components can be provided, however, in one piece or multiple pieces).

Optionally the connection arrangement can have contact protection means which are configured from an electrically insulating material, for example from a plastics material, and which at least partially encase the connection element. For example, it is possible to provide a contact protection means which at least partially encases the bearing portion and/or the press portion, optionally together, in order to provide a contact protection for a technician or user of the connection arrangement so that no conductive components can be inadvertently touched.

It can be provided that the connection element, in particular the bearing portion and/or the press portion, have a coating in order to influence in a targeted manner the electrical and mechanical properties of the electrical connection element, quite particularly preferably in the region of an electrical and mechanical bearing or contact surface, as the lateral contact surface of the press portion or the bearing surface of the bearing portion. The static friction coefficient, the electrical conductivity and/or thermal conductivity in the connection can be improved or adapted in each case by the coating.

According to a development of the invention, it can be provided that the electrical connection element has a mechanical interface for a rotationally fixed mechanical connection to at least one of the electrical conductors.

Preferably, the bearing portion of the electrical connection element has the mechanical interface. The press portion or another component of the electrical connection element can optionally also have the mechanical interface. The mechanical interface can also be configured between the bearing portion and the press portion, at times even together on the bearing portion and the press portion.

A plurality of mechanical interfaces can also be provided, for example a first mechanical interface for a rotationally fixed connection to the first electrical conductor and a second mechanical interface for a rotationally fixed connection to the second electrical conductor.

The mechanical interface can be, in particular, an axial portion which has a polygonal cross section along the longitudinal axis or between the two ends of the electrical connection element. The outer lateral surface of the electrical connection element in the region of the mechanical interface thus can have, for example, and without limitation a three-sided, four-sided, five-sided, six-sided, seven-sided, eight-sided or other cross-sectional profile.

As an alternative to a polygonal cross-sectional profile, for example, a star-shaped profile or a rib-groove mechanism can also be provided in order to permit the rotationally fixed connection. In principle, any positive and/or material connection (for example adhesive bonding) can be provided, optionally even a non-positive connection between the electrical connection element and at least one of the electrical conductors, in order to provide a rotationally fixed connection.

In particular, when the mechanical connection is produced between the two conductors by screwing the first fastening means to the second fastening means, a rotationally fixed arrangement of the electrical connection element between the electrical conductors can be advantageous in order to simplify the assembly. Alternatively or additionally to a rotationally fixed connection with at least one of the electrical conductors, in principle the mechanical interface can also be configured to be connected by a tool, for example a wrench, so that the technician can manually fix the electrical connection element while producing the screw connection of the fastening means. A rotationally fixed connection can optionally also be entirely dispensed with, for example when the fastening means are to be pressed together (for example when the second fastening means is configured as a bolt and the first fastening means is configured as a receiver for the bolt).

The rotationally fixed connection to the at least one electrical conductor can take place directly by the cooperation of the mechanical interface with a corresponding mating mechanical interface of the respective electrical conductor. The rotationally fixed connection, however, can also take place indirectly (generally preferred) by the cooperation of the mechanical interface with a corresponding mating mechanical interface of a housing shell of the respective electrical conductor, which in turn is mechanically connected to the electrical conductor.

In an advantageous development of the invention, it can be provided that the press portion is configured to receive the first fastening means in a rotationally fixed manner.

The press portion can preferably have a suitable internal geometry inside the connection bore which can be connected in a rotationally fixed manner to a corresponding external geometry of the first fastening means. The aforementioned external geometry of the first fastening means is preferably arranged on the end region of the first fastening means facing the second electrical conductor (when the first fastening means is mounted in the press portion).

As the first fastening means can be received in a rotationally fixed manner in the press portion, the first fastening means can be screwed to the second fastening means in an even simpler manner, in particular (but not exclusively) when the electrical connection element also has the aforementioned mechanical interface for the rotationally fixed mechanical connection with at least one of the electrical conductors. The connection arrangement can finally be assembled particularly conveniently, by the technician introducing a torque or a rotation into one of the fastening means (in particular into the second fastening means) without having to carry out further measures. In particular, the need to position an additional tool in order to exert counterpressure when screwing together the fastening means can be dispensed with.

For increasing the static friction between the first fastening means and the press portion, the first fastening means and/or the press portion can have a suitable coating and/or structuring of the surface (for example a fluting). A corresponding coating and/or surface structuring can also be provided, for example, in the connection between the lateral contact surface of the press portion and the inner lateral surface of the contact recess of the first electrical conductor and/or in the connection between the side surface of the second electrical conductor and the bearing surface of the bearing portion.

Optionally it can be provided that the press portion is configured to receive the fastening means captively. To this end, for example, the press portion can have a latching hook at its free end.

In an advantageous development of the invention, it can be provided that the press portion is slotted in the longitudinal direction in order to form the at least one lateral contact surface, in each case between two longitudinal slots.

Preferably, in this manner a plurality of lateral contact surfaces can be formed, in particular in the manner of spring tabs of a spring cage.

The at least one lateral contact surface or spring tab preferably has a movable free end which corresponds to the first end of the electrical connection element.

However, the at least one lateral contact surface or spring tab can also be attached on both sides, i.e. have no free end. In this case, it is particularly advantageous to arrange or configure the first fastening means between the first end of the electrical connection element and the at least one spring tab (i.e. "below" the spring tabs) so that a screw connection with the second fastening means brings about or reinforces a radial bulging of the spring tabs due to the axial force oriented in the direction of the second fastening means.

Due to the longitudinal slotted portions of the press portion, it is possible to deflect in a non-destructive and radial manner at least one lateral contact surface by means of the first fastening means in order to bring about the non-positive connection inside the contact recess thereby.

As an alternative to a longitudinal slotted portion, however, it is possible to provide any other measures which also permit a radial spreading apart/radially enlarging of the press portion, in particular a non-destructive radial spreading apart. Optionally, a permanent reshaping of the press portion can be provided by screwing or pressing the two fastening means in order to bring about the non-positive connection inside the contact recess.

According to a development of the invention, it can be provided that the at least one lateral contact surface has a convex bulge.

Due to the convex bulge of the at least one lateral contact surface, it is possible to compensate for an offset between the two electrical conductors transversely to the connection direction or to the extent of the electrical connection element or a tilting of the electrical conductors relative to one another, since the electrical connection element then can tilt without loss of contact within the contact recess. In this manner, a type of ball bearing can be provided for the connection between the press portion and the contact recess. For example, it is possible that an angled arrangement between the two electrical conductors of up to 5° or more can be bridged by the convex bulge.

It can be provided that the contact recess of the first electrical conductor is axially lengthened when the thickness of the first electrical conductor is not sufficient for a non-positive, tolerance-compensating connection with the press portion. To this end, optionally a sleeve-shaped body can be placed on the electrical conductor (In one piece or as a separate component) in order to lengthen the contact recess correspondingly.

The invention further relates to an electrical connection system, in particular an electrical connection system for high voltage technology, having an electrical connection arrangement according to the embodiments disclosed herein, and the first fastening means.

The first fastening means is preferably received in the press portion inside the connection bore, in particular captively received.

In an advantageous development, it can be provided that for bringing about the spreading apart of the press portion, as a result of screwing together the two fastening means, the first fastening means tapers on the outer lateral surface in the direction of the second end of the connection element.

Alternatively or additionally, it can be provided that for bringing about the spreading apart/radially enlarging of the press portion, as a result of screwing together the two fastening means, the press portion tapers on the inner lateral surface inside the connection bore in the direction of the second end of the connection element.

Due to the oblique surface, an axial movement of the first fastening means when screwed to the second fastening means can result in a radial spreading apart/radially enlarging.

The spreading apart or force deflection is particularly effective when the two connecting partners correspondingly taper, preferably with the same slope of taper. In principle, however, it can be sufficient if only one of the two connecting partners (first fastening means or press portion) correspondingly tapers.

Due to the described tapering of the first fastening means and/or the press portion it is possible, by particularly simple technical means, to spread apart the press portion radially by screwing the first fastening means to the second fastening means, while the first fastening means penetrates deeper into the press portion. During the translation of the press portion in the direction of the second electrical conductor, the press portion or the at least one lateral contact surface thereof is pushed radially outwardly against the inner lateral surface of the contact recess.

The corresponding contact region between the first fastening means and the press portion is preferably conically shaped, i.e. preferably a conical tapering is provided. In principle, however, any tapering or any concave/convex contact region can be provided.

A tapering is not absolutely necessary in order to bring about the spreading apart. For example, and without limitation, it is also possible to provide studs, bulged elevations or other elevations, etc. which are arranged so as to be distributed along the circumference of the first fastening means and which only come to bear against the inner lateral surface of the contact recess when the first fastening means penetrates further into the press portion due to the screw connection, so that the elevations then press against the inner lateral surface and bring about the spreading apart. In particular, the elevations do not have to be arranged so as to circulate fully along the circumference of the first fastening means; for example it is possible to provide a plurality of elevations which are arranged so as to be distributed at intervals or in some portions along the circumference of the first fastening means and which are defined relative to one another.

It can be provided that the first fastening means has an internal thread for forming the threaded connection with the second fastening means. Preferably, the first fastening means has a screw nut or is configured as a screw nut.

In particular, a first fastening means which is configured as a screw nut has proved particularly suitable. However, in particular, any sleeve-shaped first fastening means can be suitable, in particular a sleeve-shaped fastening means with an internal thread. Alternatively, however, a shank-shaped first fastening means can also be provided, for example a screw element with an external thread or a bolt without an external thread.

An interference fit or press connection can also be provided between the fastening means. A threaded connection is thus not absolutely necessary. The first fastening means can thus have, in particular, an accurate receiver for a bolt or a bolt shank or an elongated second fastening means. Optionally, the first fastening means can have a tapering inside the connection bore, in particular in the bearing portion or at least in the region of the bearing portion, so that by introducing the second fastening means into the connection bore the connection element is radially spread apart at its first end or on the press portion.

The invention further relates to an electrical connection system, in particular an electrical connection system for high voltage technology, having an electrical connection arrangement according to the embodiments disclosed herein, and having the second fastening means.

The second fastening means is preferably received at least in some portions in the bearing portion inside the connection bore.

Preferably, the electrical connection system has the first fastening means and the second fastening means. However, in principle, the electrical connection system can have only the first fastening means or only the second fastening means.

It can be provided that the second electrical conductor has a fastening recess. The fastening recess is preferably a through bore and is configured to receive the second fastening means or the second fastening means can be passed through the fastening recess.

Preferably, in the assembled state of the connection system, the fastening recess, the connection bore and the contact recess are arranged so as to be aligned with one another, preferably coaxially.

It can be provided that the second fastening means has a screw element, preferably a conventional metal screw.

The screw element can have a screw shank which can be passed through the fastening recess of the second electrical conductor and which extends at least in some portions through the connection bore, wherein the screw shank has an external thread for forming the threaded connection with the first fastening means.

The screw element can have a screw head which is supported directly (for example by a sufficiently large bearing flange with a larger cross-sectional extent than the fastening recess) or indirectly (for example by a separate bearing flange such as a washer) on the electrical conductor.

Instead of a screw element which is passed through a fastening recess of the second electrical conductor, optionally the second fastening means can also extend as a projection in one piece from a side surface of the second electrical conductor or be correspondingly connected to the second electrical conductor so that the second fastening means extends as a shank transversely, preferably at right angles, to the corresponding side surface of the second electrical conductor. The design of the second fastening means as a screw element, however, is preferred.

The second fastening means can also be configured as a bolt and thus does not necessarily have to have an external thread. In this case, the first fastening means can advantageously be configured for the non-positive, accurate receiving of the bolt. In this manner, a press connection can be produced between the fastening means.

At this point it should be mentioned that the features which refer to the first fastening means can be exchangeable with the second fastening means, and vice versa. The fastening means Itself can also be arranged so as to be exchanged. For example, a screw element can be provided for connecting to the first electrical conductor and a screw nut can be provided for connecting to the second electrical conductor:

The invention further relates to an electrical connection system, in particular an electrical connection system for high voltage technology, having an electrical connection arrangement according to the embodiments disclosed herein, and having the first electrical conductor and the second electrical conductor.

Preferably, the electrical connection system has the first fastening means and the two electrical conductors, particularly preferably the first fastening means and the second fastening means and the two electrical conductors.

It can be provided that the electrical conductors are configured as rigid electrical conductors, for example as conductor rails. However, in principle, the electrical conductors can be any electrical conductors, for example flexible electrical conductors (for example single wire conductors or stranded wires) which optionally are compressed in a plate-shaped manner on a portion provided for connecting to the respective other electrical conductor, for example by a cold welding method.

It is possible that at least one of the electrical conductors is fastened or can be fastened to an independent component, for example to a body component of a vehicle. Alternatively or additionally, it can also be provided that at least one of the electrical conductors is fastened or can be fastened to an electrical consumer or high voltage battery.

In an advantageous development of the invention, it can be provided that the fastening recess of the second electrical conductor, through which the second fastening means is passed or can be passed, has a larger cross-sectional extent that the portion of the second fastening means running through the fastening recess, for compensating for mechanical tolerances.

The fastening recess can optionally also have a larger cross-sectional extent than the contact recess of the second electrical conductor.

Tolerances in the spatial orientation of the two conductors can be compensated even more effectively by an oversized fastening recess. For example, the fastening recess can also be configured as elliptical recess or as an elongated hole.

In the case of an "oversized" fastening recess, in particular, it can be provided that the second fastening means has a correspondingly large bearing flange for support, such as for example an "oversized" screw head or bolt head or a washer with a larger cross-sectional extent than the fastening recess.

It can be provided that the electrical connection system has further electrical conductors in addition to the first electrical conductor and the second electrical conductor. For example, it is possible to provide a third electrical conductor and a fourth electrical conductor which can be connected together electrically and mechanically by means of a further connection arrangement. In this manner, any number of conductor pairs can be formed.

In particular, in the context of the connection system according to the invention, a plurality of conductor rails which are combined in a common subassembly on the high voltage battery and optionally connected together via fuses, relays or other electrical components and sub-assemblies, are further connected together via a corresponding connection arrangement to conductor rails, which represent part of a common connector panel for supplying individual consumers.

It can be provided that the electrical connection system also has one or more module connectors which have in each case one or more further electrical conductors, and are connected to the respective end consumers and the first electrical conductor or the second electrical conductor.

In principle, it can be provided that the electrical connection system has a plurality of connection elements for connecting the two electrical conductors or further electrical conductors, which form a common conductor pair and are connected together in each case by means of a connecting element.

In particular, a multi-pole electrical connection consisting of at least two conductor pairs (a first conductor pair consisting of the first electrical conductor and the second electrical conductor, and a second conductor pair consisting of the third electrical conductor and a fourth electrical conductor) can be provided in order to provide, in particular, an option for connecting a complete power circuit.

The invention further relates to a method for producing an electrical and mechanical connection between a first electrical conductor and a second electrical conductor having at least the following method steps: arranging an electrical connection element with a press portion arranged on a first end, a bearing portion arranged on a second end and a connection bore, which extends at least between the bearing portion and the press portion, between the electrical conductors; introducing a first fastening means into the connection bore (preferably inside the press portion) or designing the connection element (preferably the press portion) such that it forms a first fastening means itself; introducing a second fastening means into the connection bore (preferably at least inside the bearing portion;) and connecting the two fastening means so that the first fastening means or the second fastening means radially spreads apart/radially enlarges the press portion in order to bring about a non-positive connection between at least one lateral contact surface of the press portion and an inner lateral surface of a contact recess of the first electrical conductor.

Preferably, it is also provided that by the connection of the fastening means a bearing surface of the bearing portion comes into contact with a side surface of the second electrical conductor in the axial direction (in particular non-positively), preferably even before the press portion is spread apart/radially enlarged.

Advantageously, an electrically conductive flexible compensating unit can be provided for connecting, in particular, rigid electrical conductors. The compensating unit or the connection arrangement can be exceptionally easy to assemble and exceptionally robust in use.

The electrical connection arrangement can be arranged between the two electrical conductors, in particular conductor rails, wherein both electrical conductors or conductor rails preferably can have in each case recesses or bores (contact recess and fastening recess). Due to the connecting force (in particular screw force or pressing force) between the two fastening means, on the one hand, the bearing surface can be brought to bear against the side surface of the second electrical conductor, and non-positively fixed in the axial direction, and at the same time the press portion can be radially spread apart in order to be clamped in the contact recess of the first electrical conductor.

According to the invention, it is possible to provide a stable transmission of current with low impedance even in different tolerance positions of the electrical conductors. The fastening or fixing can be advantageously permitted by a three-part system consisting of the connection element, the first fastening means and the second fastening means.

The electrical conductor can be part of a connector panel (on the part of the consumer and/or on the part of the supplier), Preferably, an electrical or mechanical connection can be provided between two conductor rails of a high voltage system in the manner described above. Thus, for example, a high voltage battery, for example a vehicle battery, can be produced via a first conductor rail with a second conductor rail for supplying at least one electrical consumer (for example the main unit in the traction path or a secondary unit in the secondary unit path).

Features which have been described in combination with one of the subjects of the Invention, namely provided by the electrical connection arrangement according to the invention, the electrical connection system according to the invention and the method according to the invention, can also be advantageously implemented for the other subjects of the invention. Advantages which have been mentioned in combination with one of the subjects of the invention can also be understood to refer to the other subjects of the invention.

The terms "comprising, "having" or "with" do not exclude any other features or steps. Moreover, terms such as "one" or "the", which refer to a single number of steps or features, do not exclude a plurality of features or steps and vice versa.

The terms such as "first" or "second", etc. are to be used primarily for reasons of differentiating between the respective device features or method features, and are not necessarily intended to indicate that the features mutually depend on one another or relate to one another.

The values and parameters described in the present case include deviations or fluctuations of ±10% or less, preferably ±5% or less, further preferably ±1% or less, and quite particularly preferably ±0.1% or less from the respectively mentioned value or parameter, provided these deviations are not excluded in the implementation of the invention in practice. The specification of ranges by initial and final values also encompasses all of those values and fractions which are included in the respectively mentioned range, in particular the initial and final values and one respective mean value.

Exemplary embodiments of the Invention are described in more detail hereinafter with reference to the drawings.

The figures show in each case preferred exemplary embodiments in which individual features of the present invention are shown in combination with one another. Features of an exemplary embodiment are also able to be implemented separately from the other features of the same exemplary embodiment, and can be accordingly combined together with features of other exemplary embodiments in a simple manner by a person skilled in the art to form further meaningful combinations and sub-combinations.

SUMMARY

An electrical connection arrangement, connection system and method for producing an electrical connection between two electrical conductors generally provides an electrical connection element (8) having a press portion (9) at a first end, and a bearing portion (10) that has a bearing surface (14) at a second end, and a connection bore (16) that extends from the press portion (9) to the bearing portion (10). A first fastening means (17) and a second fastening means (18) both extend, at least partially though the connection bore (16) and the first and second fastening means (17, 18) are interconnectable with one another.

A principal aspect of the present invention is an electrical connection arrangement (4) for the electrical and mechanical connection of a first electrical conductor (2) to a second electrical conductor (3), having an electrical connection element (8) with a first end and with a second end, wherein a press portion (9) is arranged at the first end, the press portion having at least one lateral contact surface (11) for electrical contact with an inner lateral surface (12) of a contact recess (13) of the first electrical conductor (2), and wherein a bearing portion (10) is arranged at the second end, the bearing portion having a bearing surface (14) for non-positive connection to a side surface (15) of the second electrical conductor (3), wherein a connection bore (16) extends at least between the bearing portion (10) and the press portion (9) so that the connection element (8) can receive a first fastening means (17) or forms a first fastening means (17) itself, and can receive a second fastening means (18) which can be connected to the first fastening means (17) so that the non-positive connection is produced between the bearing surface (14) of the bearing portion (10) and the side surface (1.5) of the second electrical conductor (3), and wherein the press portion (9) can be radially spread apart by the first fastening means (17) and/or by the second fastening means (18) in order to bring about a non-positive connection between the at least one lateral contact surface (11) and the inner lateral surface (12) of the contact recess (13), by the two fastening means (17, 18) being connected together.

A further aspect of the present invention is an electrical connection arrangement (4), characterized in that the connection element (8) is primarily configured to be sleeve-shaped, wherein the connection bore (16) extends entirely through the connection element (8).

A further aspect of the present invention is an electrical connection arrangement (4), characterized in that the bearing portion (10) is configured in one piece with the press portion (9).

A further aspect of the present invention is an electrical connection arrangement (4), characterized in that the connection element (8), preferably the bearing portion (10) of the connection element (8), has a mechanical interface (26) for a rotationally fixed mechanical connection to at least one of the electrical conductors (2, 3).

A further aspect of the present invention is an electrical connection arrangement (4), characterized in that the press portion (9) is configured to receive the first fastening means (17) in a rotationally fixed manner.

A further aspect of the present invention is an electrical connection arrangement (4), characterized in that the press portion (9) is slotted in the longitudinal direction in order to form the at least one lateral contact surface (11) in each case between two longitudinal slots, wherein preferably a plurality of lateral contact surfaces (11) are configured in the manner of spring tabs of a spring cage.

A further aspect of the present invention is an electrical connection arrangement (4), characterized in that the at least one lateral contact surface (11) has a convex bulge.

A further aspect of the present invention is an electrical connection system (1), in particular electrical connection system (1) for high voltage technology, having an electrical connection arrangement (4) and a first fastening means (17), wherein the first fastening means (17) is received in the press portion (9) inside the connection bore (16).

A further aspect of the present invention is an electrical connection system (1), characterized in that for bringing about the spreading apart of the press portion (9) as a result of the connection of the two fastening means (17, 18), the first fastening means (17) tapers on the outer lateral surface and/or the press portion (9) tapers on the inner lateral surface inside the connection bore (16), in the direction of the second end of the connection element (8), preferably conically.

A further aspect of the present invention is an electrical connection system (1), characterized in that the first fastening means (17) has an internal thread for forming a threaded connection with the second fastening means (18).

A further aspect of the present invention is an electrical connection system (1), having a second fastening means (18), wherein the second fastening means (18) is received at least in some portions in the bearing portion (10) inside the connection bore (16).

A further aspect of the present invention is an electrical connection system (1), characterized in that the second fastening means (18) has a screw element with a screw shank (19) which can be passed through a fastening recess (20) of the second electrical conductor (3) and which extends at least in some portions through the connection bore (16), wherein the screw shank (19) has an external thread for forming a threaded connection with the first fastening means (17); and a screw head (21) which is supported directly or indirectly on a side surface of the second electrical conductor (3) facing away from the bearing surface (14) of the bearing portion (10).

A further aspect of the present invention is an electrical connection system (1) having the first electrical conductor (2) and the second electrical conductor (3), wherein the electrical conductors (2, 3) are configured in each case as conductor rails.

A still further aspect of the present invention is an electrical connection system (1), characterized in that a fastening recess (20) of the second electrical conductor (3), through which the second connection means (18) is passed, has a larger cross-sectional extent than the portion of the second connection means (18) running through the fastening recess (20), for compensating for mechanical tolerances.

An even still further aspect of the present invention is a method for producing an electrical and mechanical connection between a first electrical conductor (2) and a second electrical conductor (3), having at least the following method steps: arranging an electrical connection element (8) with a press portion (9) arranged on a first end, a bearing portion arranged on a second end and a connection bore (16), which extends at least between the bearing portion (10) and the press portion (9), between the electrical conductors (2, 3); introducing a first fastening means (17) into the connection bore (16) or designing the connection element (8) such that it forms a first fastening means (17) itself; introducing a second fastening means (18) into the connection bore (16); and connecting the two fastening means (17, 18) so that a bearing surface (14) of the bearing portion (10) comes into contact with a side surface (15) of the second electrical conductor (3) and the first fastening means (17) or the second fastening means (18) radially spreads apart the press portion (9) in order to bring about a non-positive connection between at least one lateral contact surface (11) of the press portion (9) and an inner lateral surface (12) of a contact recess (13) of the first electrical conductor (2).

These and other aspects of the present invention are more fully disclosed and described herein.

BRIEF DESCRIPTIONS OF THE FIGURES

Elements which are functionally the same are provided with the same reference signs in the figures.

DETAILED DESCRIPTION OF THE PREFERRED EMBODIMENTS

An electrical connection system 1 according to a first exemplary embodiment is shown in different states in a lateral sectional view in FIGS. 1 to 4.

Figure 1:
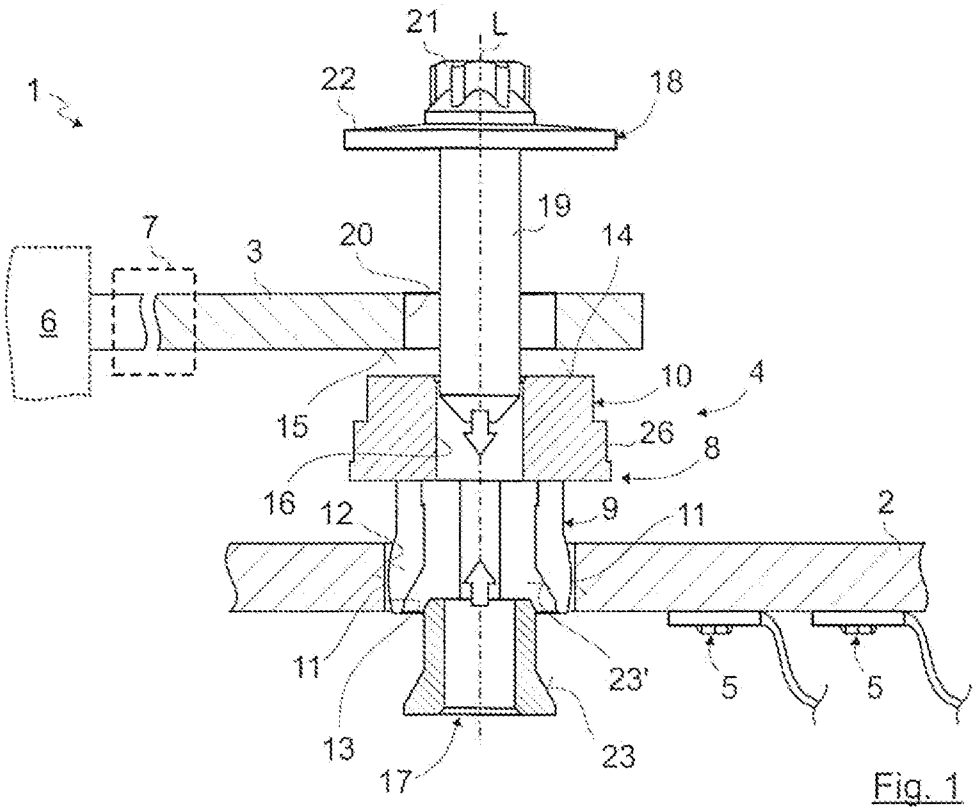
FIG. 1 shows a connection system in an unconnected state according to an exemplary embodiment of the invention in a lateral sectional view.

The electrical connection system 1 has a first electrical conductor 2 and a second electrical conductor 3, which in the exemplary embodiment are configured in each case as conductor rails and which can be connected by means of an electrical connection arrangement 4. The state of the connection system 1 when not yet connected is shown in FIG. 1.

The first electrical conductor 2 can be, for example, a connector panel or the first electrical conductor 2 can be part of a connector panel which is connected to one or more electrical consumers via one or more electrical outputs 5, for example to a main unit or secondary unit of an electric vehicle. The second electrical conductor 3 can be, for example, a conductor rail which is connected in the load path or charging path to a high voltage battery 6 and which can be directly or indirectly connected to the high voltage battery 6 (for example via an electrical sub-assembly) which is indicated in FIG. 1 as a black box 7.

The connection arrangement 4 has an electrical connection element 8 with a press portion 9 arranged on a first end and a bearing portion 10 arranged on a second end. The connection element 8 is primarily configured to be sleeve-shaped and extends along a longitudinal axis L from its first end to its second end. In the exemplary embodiment, the bearing portion 10 and the press portion 9 are configured in one piece.

Figure 5:
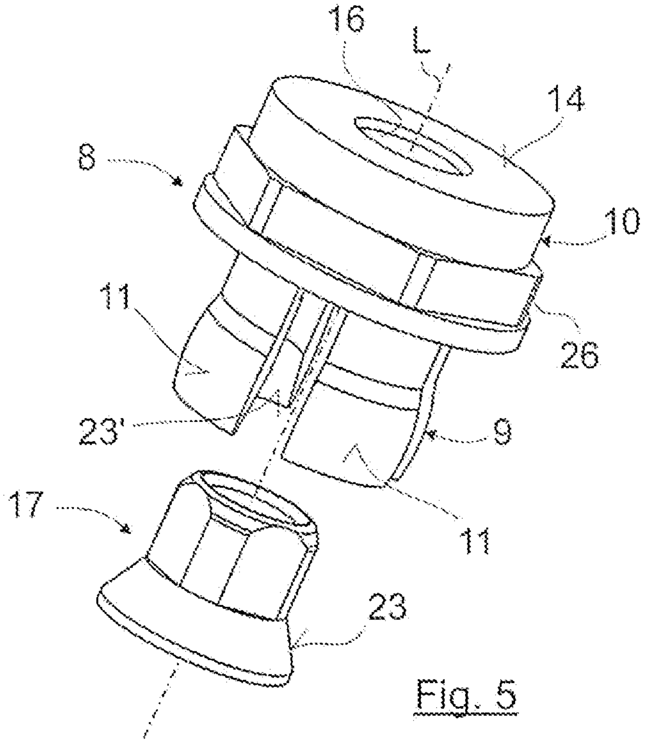
FIG. 5 shows a connection element according to the invention and a corresponding first fastening means in a perspective view.
Figure 6:
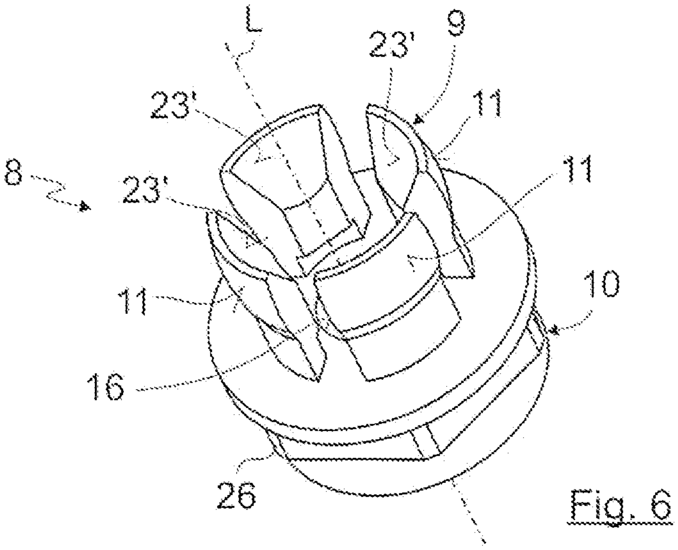
FIG. 6 shows the connection element of FIG. 5 in a further perspective view.

The press portion 9 has at least one lateral contact surface 11 for electrical contact with an inner lateral surface 12 of a contact recess 13 of the first electrical conductor 2. In order to form at least one lateral contact surface 11, the press portion 9 is preferably slotted in the longitudinal direction, wherein a lateral contact surface 11 in the manner of a spring tab of a spring cage is formed in each case between two longitudinal slots. In the exemplary embodiment, specifically four lateral contact surfaces 11 or spring tabs are provided, as can be identified particularly clearly by the perspective view of the connection element 8 in FIGS. 5 and 6.

The bearing portion 10 of the electrical connection element 8 has a bearing surface 14 for a non-positive, electrical contact with a side surface 15 of the second electrical conductor 3. In this case, in particular, a flat contact can be provided.

A connection bore 16 extends through the electrical connection element 8, from the second end through the bearing portion 10 into the press portion 9. In the exemplary embodiment, the connection bore 16 extends entirely through the whole electrical connection element 8. Due to the connection bore 16, the press portion 9 can receive a first fastening means 17 and the bearing portion 10 can receive a second fastening means 18. The two fastening means 17, 18 can be screwed together via a common threaded connection. For example, in the exemplary embodiment the first fastening means 17 is configured as a screw nut which has an internal thread for forming the common threaded connection with the second fastening means 18.

Also by way of example, the second fastening means 18 is configured as a screw element with a screw shank 19 which can be passed through a fastening recess 20 of the second electrical conductor 3 and which extends at least in some portions through the connection bore 16 and has an external thread for forming the threaded connection with the first fastening means 17.

Figure 2:
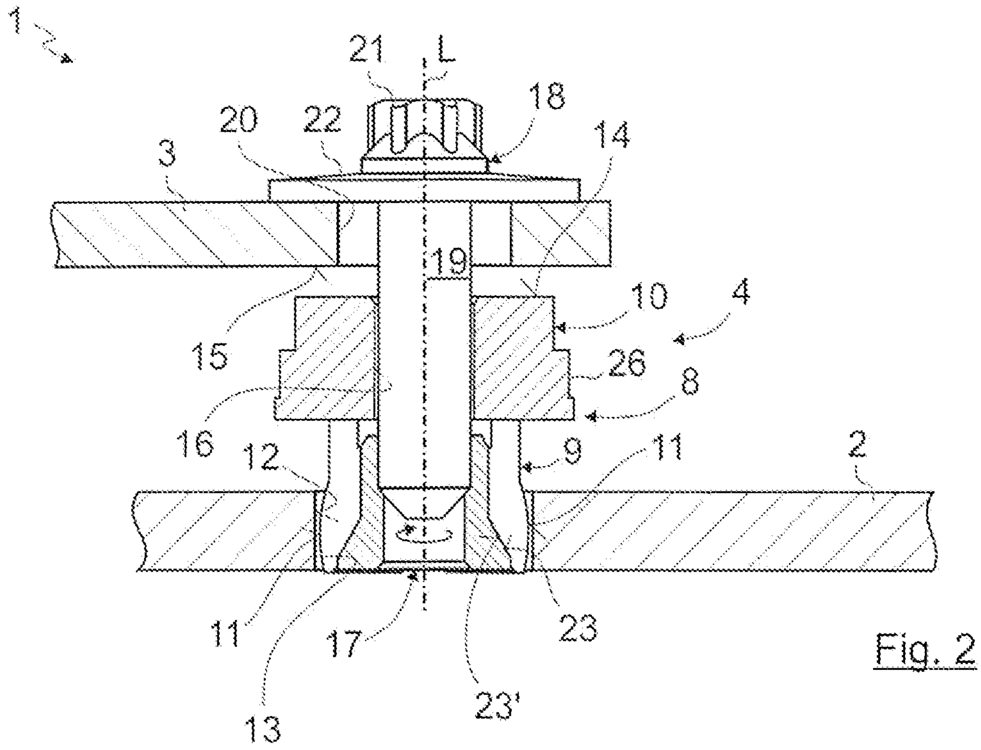
FIG. 2 shows the connection system of FIG. 1 in a preassembled state in a lateral sectional view.

In FIG. 2 a preassembled state of the electrical connection system 1 or the electrical connection arrangement 4 is shown. In the preassembled state shown, the connection arrangement 4 is captively connected to the second electrical conductor 3, by the first fastening means 17 and the second fastening means 18 already being partially screwed together.

In order to simplify the screwing process for the technician, it can be provided that the press portion 9 is configured to receive the first fastening means 17 captively. To this end, for example, the press portion 9 can have a polygonal cross-sectional path on the inner face and the first fastening means 17 can have a polygonal cross-sectional path on the outer face, which can be clearly identified, in particular, when viewing FIGS. 5 and 6 together.

Figure 3:
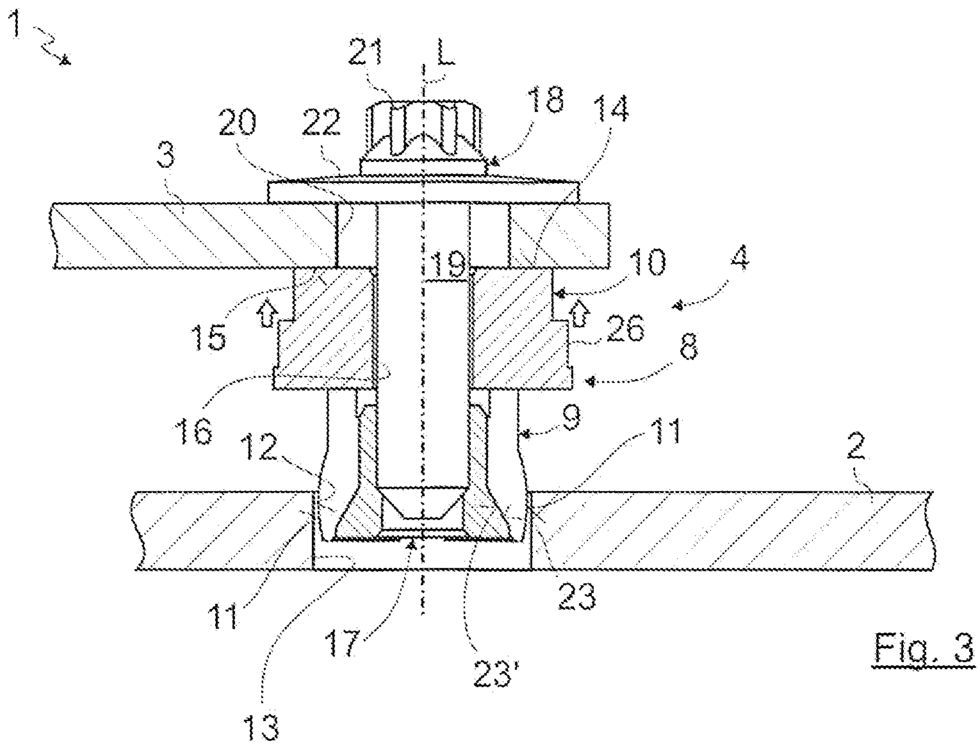
FIG. 3 shows the connection system of FIG. 1 in a partially assembled state in a lateral sectional view.

A partially assembled state of the electrical connection system 1 is shown in FIG. 3. The two fastening means 17, 18 have been screwed together further so that the first fastening means 17 moves further along the longitudinal axis L of the electrical connection element 8 in the direction of the second end of the electrical connection element 8. In this manner, the connection element 8 can be initially pressed with the front bearing surface 14 of the bearing portion 10 axially against the corresponding side surface 15 of the second electrical conductor 3 and a corresponding non-positive mechanical and electrically stable connection can be produced thereby with the second electrical conductor 3. To this end, the second fastening means 18 or the screw element has a screw head 21 which is supported on the second electrical conductor 3, for example by the bearing flange 22 shown, which in the exemplary embodiment is in one piece with the screw head 21. Alternatively, however, an indirect support can also be provided, for example via a washer.

For tolerance compensation, the fastening recess 20 is configured to be oversized relative to the screw shank 19, as can be clearly identified in FIGS. 1 to 4. As an alternative to an oversized bore, for example, an elongated hole or an elliptical fastening recess 20 can also be provided.

Figure 4:
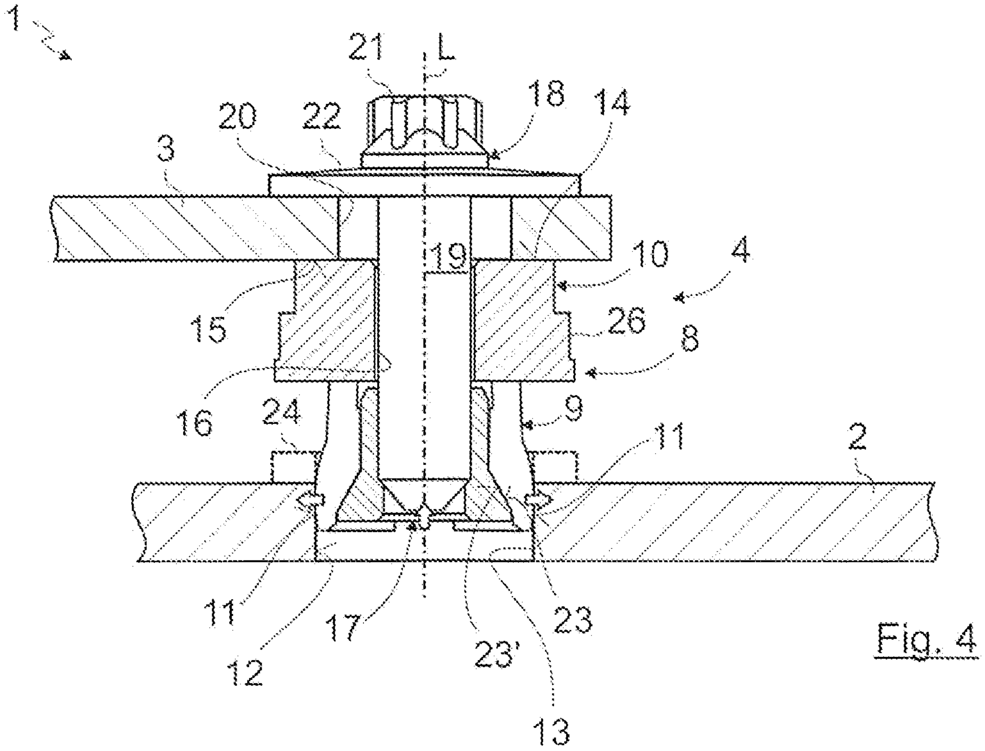
FIG. 4 shows the connection system of FIG. 1 in a fully assembled state in a lateral sectional view.

FIG. 4 finally shows a fully assembled state of the electrical connection system 1. The two fastening means 17, 18 have been screwed together further, which due to the axial movement of the first fastening means 17 in the direction of the second end of the electrical connection element 8 ultimately leads to a radial spreading apart/radially enlarging of the press portion 9, whereby a non-positive connection is brought about between the lateral contact surfaces 11 and the inner lateral surface 12 of the contact recess 13, as is indicated by the arrows shown in FIG. 4.

The aforementioned longitudinal slots between the lateral contact surfaces 11 are advantageous in order to bring about a non-destructive and releasable spreading apart, the longitudinal slots being able to provide the press portion 9 with a certain degree of elasticity. In order to bring about the spreading apart/radially enlarging, starting from the axial movement of the first fastening means 17, the press portion 9 on the inner lateral surface, i.e. inside the connection bore 16, and the first fastening means 17 on the outer lateral surface, have in each case surface portions 23, 23' tapering in the direction of the second end of the connection element 8. The tapering surface portions 23, 23' preferably have the same slope, but can also differ in terms of their slope and design. In principle, it can be sufficient if only one of the two connecting partners, consisting of the first fastening means 17 and the press portion 9, has a corresponding tapering surface portion 23, 23'.

In particular, the combination of an axial connection with the second electrical conductor 3 and a radial connection with the first electrical conductor 2 can result in a particularly advantageous electrical connection arrangement 4. If the depth of the contact recess 13 were not to be sufficient for a stable mechanical connection with suitable tolerance compensation, a sleeve-shaped body 24 can be positioned on the first electrical conductor 2, which correspondingly lengthens the contact recess 13 (shown in dashed lines in FIG. 4).

For compensating for tolerances it can be advantageous if the lateral contact surfaces 11 have a convex bulge as indicated in the exemplary embodiment. Thus the electrical connection element 8 itself can then produce a mechanically and electrically stable connection with the first electrical conductor 2 when the electrical connection element 8 tilts inside the contact recess 13, in order to compensate for a relative rotation of the electrical conductors 2, 3, for example.

Figure 7:
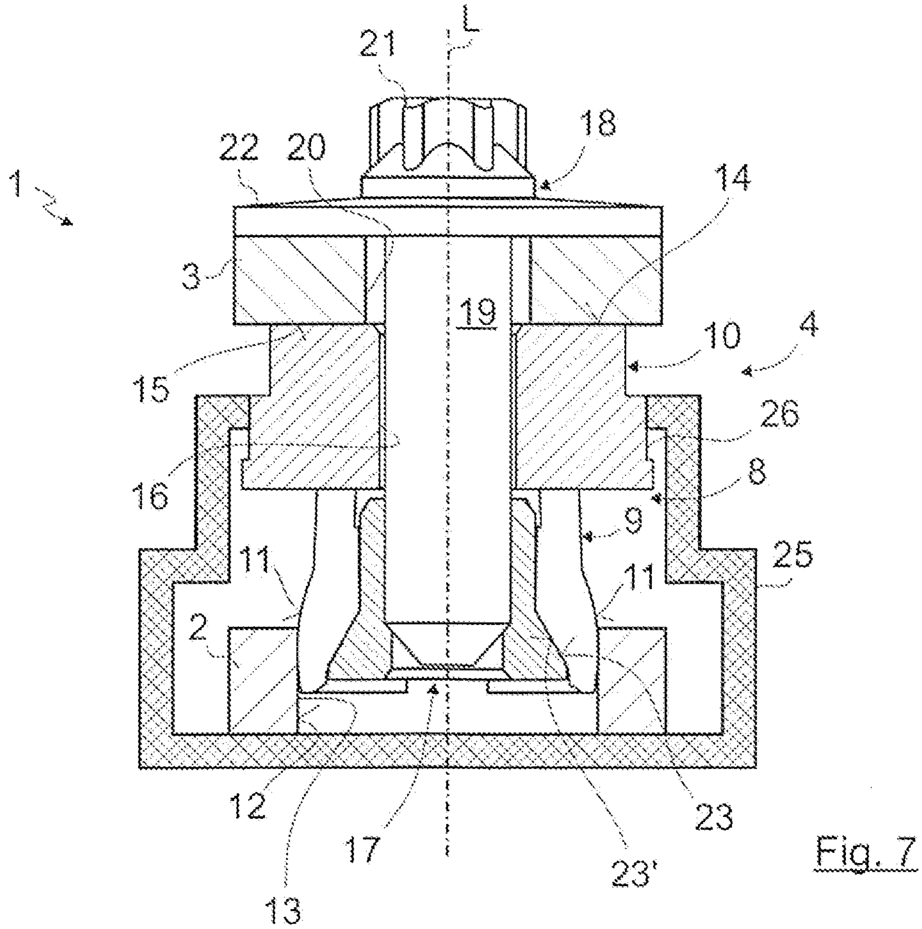
FIG. 7 shows a connection system in the fully assembled state with a housing shell for the first electrical conductor in a lateral sectional view.
Figure 8:
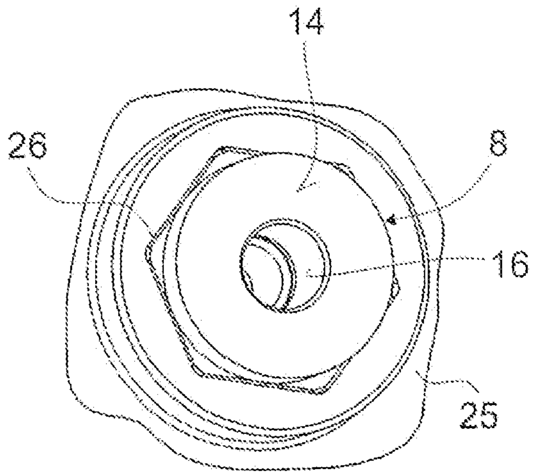
FIG. 8 shows a perspective individual view of the housing shell and the connection element of the connection system of FIG. 7.

In FIGS. 7 and 8 a further connection system 1 according to the present invention is shown in a fully assembled state, in order to illustrate a further optional optimization of the ease of assembly of the connection system 1.

The electrical conductors 2, 3, in particular the electrical conductors 2, 3 of a high voltage system, are occasionally provided with one or more housing shells 25 for protection against contact or other reasons, for example as indicated in FIGS. 7 and 8. By means of the housing shells 25 it is possible to provide, on the one hand, a captive retaining means for the electrical connection element 8 (optionally together with the first fastening means 17) and also a further anti-rotation device. Thus, for example, it can be provided that the electrical connection element 8, in particular the bearing portion 10 of the electrical connection element 8, has a mechanical interface 26 (see also FIGS. 5 and 6) for a rotationally fixed mechanical connection with the first electrical conductor 2 or the second electrical conductor 3. A rotationally fixed connection to the first electrical conductor 2 indirectly via the housing shell 25 is indicated in FIG. 7. The mechanical interface 26, as can be identified clearly in FIG. 8, has a polygonal cross section.

The exemplary embodiments and variants of the invention described above are merely to be understood by way of example. In principle, the combination of an axial and radial connection in a connection system 1 according to the invention can be implemented in many different ways, which is to be illustrated by way of example with reference to the following figures.

Figure 9:
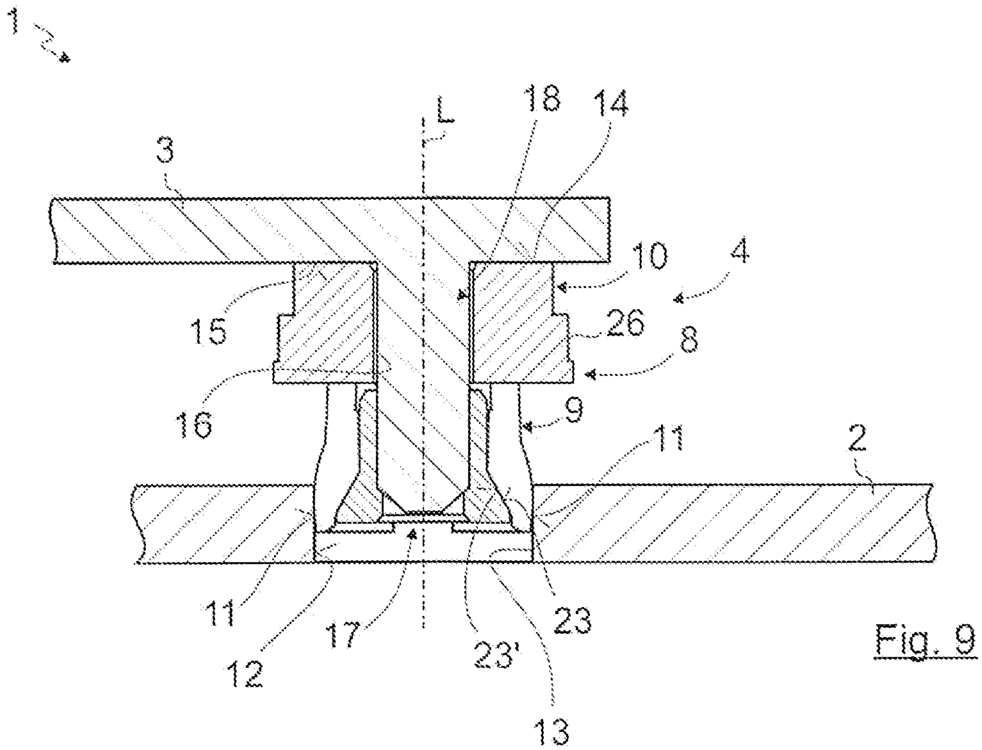
FIG. 9 shows a connection system in the fully assembled state according to a further exemplary embodiment of the invention in a lateral sectional view.

In FIG. 9 the second fastening means 18 is not configured as a screw element but as a purely shank-shaped body which extends from the second electrical conductor 3 transversely, or at right angles, from the side surface 15 provided for the connection and produces the threaded connection with the first fastening means 17. The drive for the screw connection, for example, can be produced via the first fastening means 17 or can be permitted by rotating the electrical connection element 8 together with the first fastening means 17 (for example via a rotationally fixed mechanical interface 26 in the region of the bearing portion 10, comparable with the mechanical interface 26 in FIGS. 7 and 8).

Figure 10:
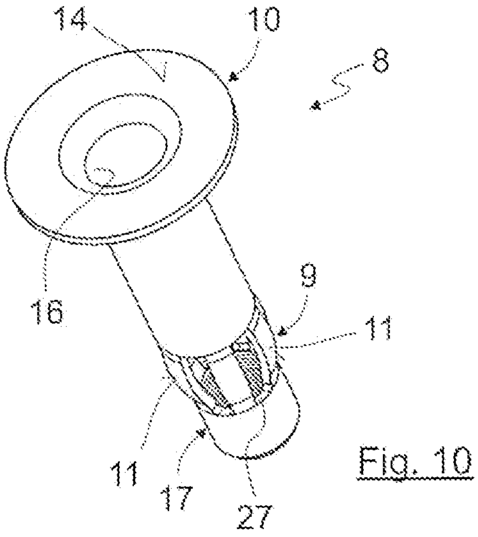
FIG. 10 shows a connection element in one piece with the first fastening means according to a further exemplary embodiment of the invention in a perspective view.
Figure 11:
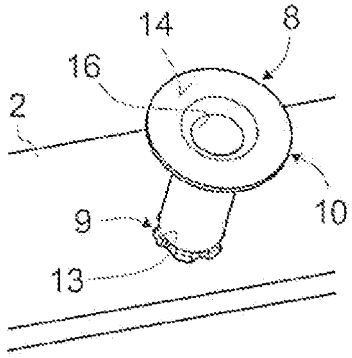
FIG. 11 shows an anti-rotation device between a one-piece connection element and the first electrical conductor in a perspective view.
Figure 12:
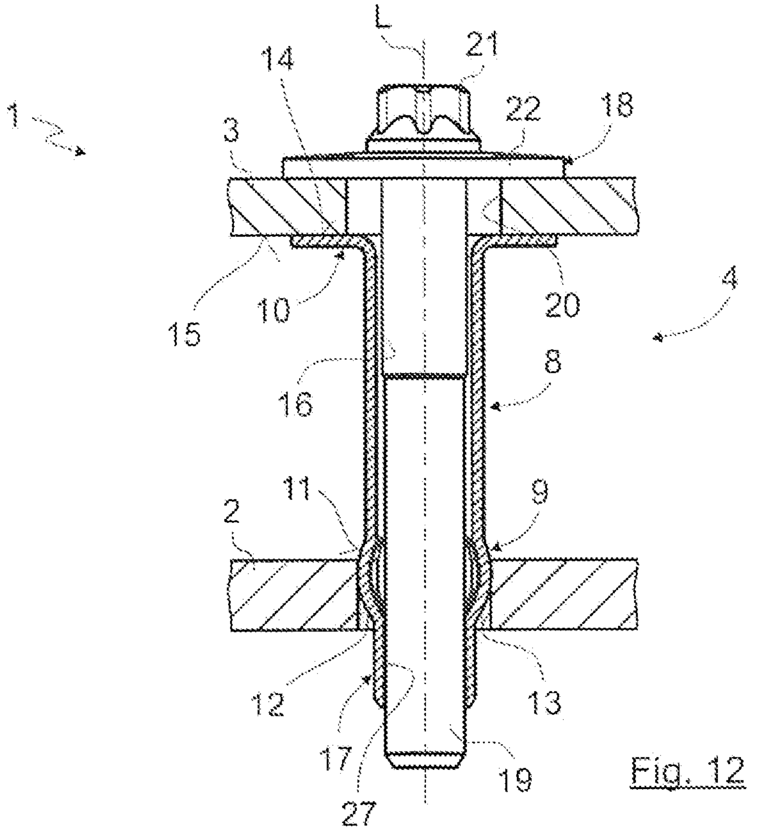
FIG. 12 shows a connection system with the connection element according to FIG. 10 in a fully assembled state in a lateral sectional view.

With reference to FIGS. 10 to 12, a variant of the invention is to be illustrated in which the electrical connection element 8 is configured in one piece with the first fastening means 17 in the manner of a expansion dowel.

As above, the electrical connection element 8 has a press portion 9 on a first end and a bearing portion 10 on a second end. In the assembled state, the electrical connection element 8 can be non-positively supported with its front bearing surface 14 on the side surface 15 of the second electrical conductor 3 facing the first electrical conductor 2 (see FIG. 12). The lateral contact surfaces 11 of the press portion 9 also serve for the non-positive connection to the inner lateral surface 12 of the contact recess 13 (see also FIG. 12). The connection bore 16 extends entirely through the electrical connection element 8 so that the second fastening means 18 can be passed through from the second end of the electrical connection element 8 to the first end of the connection element 8.

A first fastening means 17 which is functionally configured in one piece with the press portion 9 extends from the first end of the electrical connection element 8. The first fastening means 17 has an internal thread 27 inside the connection bore 16 (see FIG. 10) in order to be able to be screwed to the second fastening means 18, which is in turn a screw element. The press portion 9 has in the exemplary embodiment of FIGS. 10 to 12 slotted portions in the manner of spring tabs attached on both sides, wherein each spring tab forms one of the lateral contact surfaces 11. The spring tabs are configured to be convex or bulging and represent a defined weakened point in the electrical connection element 8. If the second fastening means 18 or the screw element is now screwed to the internal thread 27 of the first fastening means 17, the axial force component applied during the screwing process to the electrical connection element 8 causes the spring tabs to spread apart as soon as the electrical connection element 8 is supported with its front bearing surface 14 on the second electrical conductor 3. The principle is known primarily from expansion dowels in drywall construction and is surprisingly very suitable for use in the context of the present invention.

A development of the electrical connection element 8 in one piece with the first fastening means 17 can be an anti-rotation device between the press portion 9 and the contact recess 13 of the first electrical conductor 2, as shown in FIG. 11. For example, the contact recess 13 can have a polygonal cross section, as already mentioned above, in order to cooperate in a rotationally fixed manner with an axial region of the press portion 9 which is also configured to be polygonal.

Figure 13:
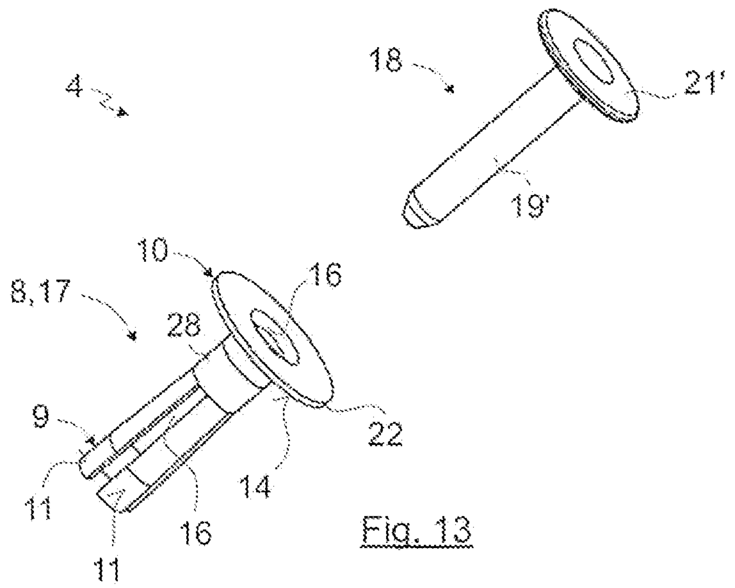
FIG. 13 shows a connection element in one piece with the first fastening means and a second fastening means configured as a bolt, according to a further exemplary embodiment of the invention in a perspective view.
Figure 14:
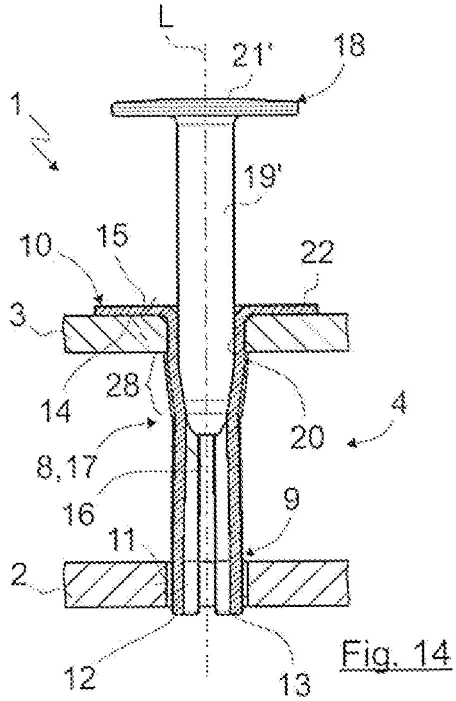
FIG. 14 shows a connection system with the connection element according to FIG. 13 in a partially assembled state in a lateral sectional view.
Figure 15:
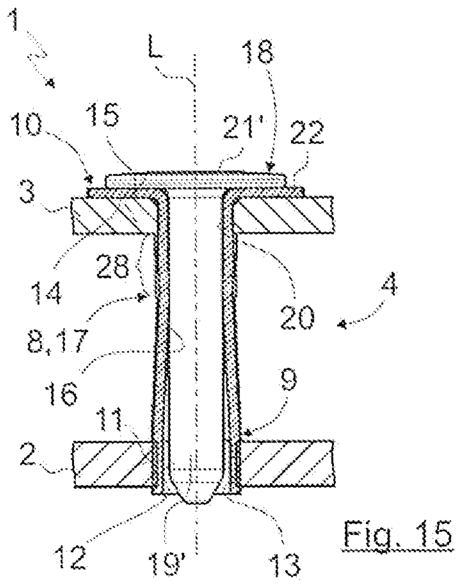
FIG. 15 shows the connection system according to FIG. 14 in a fully assembled state in a lateral sectional view.

A further exemplary embodiment of the invention is shown in FIGS. 13 to 15.

Similar to the above exemplary embodiment, the electrical connection element 8 is configured in one piece with the first fastening means 17. In contrast to the above exemplary embodiments, however, a screw connection or threaded connection is not provided between the fastening means 17, 18, but rather a press connection.

To this end, the second fastening means 18 is configured as a bolt, with a bolt head 21' and a bolt shank 19'. Accordingly, the connection bore 16 of the electrical connection element 8 is configured to receive the bolt shank 19' with an interference fit so that the fastening means 17, 18 can be pressed together with sufficient force. As can be seen with reference to FIGS. 14 and 15, the bearing flange 22 in this case is advantageously configured on the electrical connection element 8. In other words, the electrical connection element 8 is supported with its bearing surface 14 on the side surface 15 of the second electrical conductor 3 facing away from the first electrical conductor 2, after the bolt or the second fastening means 18 has been connected to the electrical connection element 8.

So that in turn the press portion 9 can be spread apart/radially enlarged, the electrical connection element 8 has a tapering portion 28 in its upper end portion facing the second electrical conductor 3. By pressing in the bolt shank 19', the electrical connection element 8 widens in the lower press portion 9 facing the first electrical conductor 2 and brings about the non-positive connection inside the contact recess 13.

It is also possible to provide the insertion of the second fastening means 18, i.e. for example the pressing-in of the bolt in FIGS. 13 to 15, starting from the first electrical conductor 2. In this case, it can be advantageous to ensure that the first fastening means 17 is not pushed out of the second electrical conductor 3. This can be implemented, for example, by an additional or alternative bearing flange 22 or another bearing portion on the side surface of the second electrical conductor 3 facing the first electrical conductor 2 and/or on the side surface of the first electrical conductor 2 facing away from the second electrical conductor 3 or by a corresponding latching means, such as a latching hook, which correspondingly engages behind at least one of the electrical conductors 2, 3. For example, the spring tabs of the press portion 9 can have a latching hook at their ends or be correspondingly re-shaped in order to form a latching hook.

This disclosure of the invention is submitted in furtherance of the Constitutional purposes of the US Patent Laws "to promote the progress of Science and the useful arts" (Article 1, Section 8).

Operation

Having described the structure of our Electrical Connection Arrangement, Connection System and Method for Producing an Electrical Connection between Two Electrical Connectors, its operation is briefly described.

A principal object of the present invention is an electrical connection arrangement (4) for electrical and mechanical connection of a first electrical conductor (2) to a second electrical conductor (3), the electrical connection arrangement (4) comprising: an electrical connection element (8), having, a first end, that defines a press portion (9), and a second end, that defines a bearing portion (10), the bearing portion (10) having a bearing surface (14), and a connection bore (16) is defined in the electrical connection element (8) and the connection bore (16) extends between the press portion (9) at the first end, and the bearing portion (10) at the second end, and the press portion (9) at the first end has at least one lateral contact surface (11) for electrical contact with an inner lateral surface (12) of a contact recess (13) defined in the first electrical conductor (2), and the bearing surface (14) of the bearing portion (10) provides a non-positive connection to a side surface (15) of the second electrical conductor (3); and a first fastening means (17), and wherein, the first fastening means (17) is separable from the electrical connection element (8) and the first fastening means (17) extends at least partially through the connection bore (16) defined in the electrical connection element (8), or the first fastening means (17) is integral with the electrical connection element (8) and the integral first fastening means (17) defines, at least partially, the connection bore (16); and a second fastening means (18) that extends at least partially through the connection bore (16) defined in the electrical connection element (8) and the second fastening means (18) is connectable with the first fastening means (17); and wherein interconnection of the second fastening means (18) with the first fastening means (17) produces the non-positive connection between the bearing surface (14) of the bearing portion (10) and the side surface (15) of the second electrical conductor (3); and the press portion (9) of the electrical connection element (8) is radially enlarged/spread apart responsive to the connection of the second fastening means (18) with the first fastening means (17); and wherein a non-positive connection between the at least one lateral contact surface (11) of the press portion (9) and the inner lateral surface (12) of the contact recess (13) defined in the first electrical conductor (2) is produced by connection of the second fastening means (18) with the first fastening means (17); and wherein a mechanical interface (26) of the electrical connection element (8), rotationally fixes connection of the electrical connection element (8) to the first electrical conductor (2), or to the second electrical conductor (3).

A further object of the present invention is an electrical connection arrangement (4) wherein the electrical connection element (8) is sleeve-shaped; and the connection bore (16) extends entirely through the electrical connection element (8).

A further object of the present invention is an electrical connection arrangement (4) wherein the bearing portion (10) is configured in one piece with the press portion (9).

A further object of the present invention is an electrical connection arrangement (4) wherein the press portion (9) defines plural longitudinal slots to form the at least one lateral contact surface (11) in each case between two of the plural longitudinal slots.

A further object of the present invention is an electrical connection arrangement (4) wherein the at least one lateral contact surface (11) has a radially outward convex bulge.

A further object of the present invention is an electrical connection system (1) wherein, at least one of the separable first fastening means (17), or the integral first fastening means (17), tapers on an outer lateral surface in the direction of the second end of the electrical connection element (8); or the press portion (9) tapers on an inner lateral surface inside the connection bore (16), in the direction of the second end of the electrical connection element (8).

A further object of the present invention is an electrical connection system (1) wherein the first fastening means (17) defines an internal thread for a threaded connection with the second fastening means (18).

A further object of the present invention is an electrical connection system (1) wherein the second fastening means (18) has a screw element, the screw element having a screw head (21), and a screw shank (19) that is interconnected with the screw head (21), and the screw head (21) contacts, directly or indirectly, a side surface of the second electrical conductor (3) opposite the bearing surface (14) of the bearing portion (10); and the screw shank (19) can be passed, at least partially, through a fastening recess (20) defined in the second electrical conductor (3) and at least partially through the connection bore (16) defined in the electrical connection element (8), and wherein the screw shank (19) defines an external thread for forming a threaded connection with the first fastening means (17).

A further object of the present invention is an electrical connection system (1) wherein the first electrical conductor (2) and the second electrical conductor (3), are configured as conductor rails.

A further object of the present invention is an electrical connection system (1) further comprising: a fastening recess (20) defined in the second electrical conductor (3); and the second connection means (18) is passed, at least partially through the fastening recess (20) defined in the second electrical conductor (3); and the fastening recess (20) has a larger cross-sectional extent than the portion of the second connection means (18) passing through the fastening recess (20), for compensating for mechanical tolerances.

A further object of the present invention is a method for producing an electrical and mechanical connection between a first electrical conductor (2) and a second electrical conductor (3) comprising the steps: providing an electrical connection element (8), the electrical connection element (8) having a first end, that defines a press portion (9), and a second end, that defines a bearing portion (10), the bearing portion (10) having a bearing surface (14), and a connection bore (16) is defined in the electrical connection element (8) and the connection bore (16) extends between the press portion (9) at the first end, and the bearing portion (1) at the second end, and the press portion (9) at the first end has at least one lateral contact surface (11) for electrical contact with an inner lateral surface (12) of a contact recess (13)

defined in the first electrical conductor (2), and the bearing surface (14) of the bearing portion (10) provides a non-positive connection to a side surface (15) of the second electrical conductor (3); and a first fastening means (17) that extends at least partially through the connection bore (16) defined in the electrical connection element (8); and a second fastening means (18) that extends at least partially through the connection bore (16) defined in the electrical connection element (8) and the second fastening means (18) is connectable with the first fastening means (17); and wherein interconnection of the second fastening means (18) with the first fastening means (17) produces the non-positive connection between the bearing surface (14) of the bearing portion (10) and the side surface (15) of the second electrical conductor (3); and wherein the press portion (9) of the electrical connection element (8) is radially enlarged/spread apart responsive to connection of the second fastening means (18) with the first fastening means (17); and wherein a non-positive connection between the at least one lateral contact surface (11) of the press portion (9) and the inner lateral surface (12) of the contact recess (13) defined in the first electrical conductor (2) is produced by connection of the second fastening means (18) with the first fastening means (17); and positioning the electrical connection element (8) between the first electrical conductor (2) and the second electrical conductor (3); and introducing the first fastening means (17) into the connection bore (16); and introducing the second fastening means (18) into the connection bore (16); and connecting the first fastening means (17) and the second fastening means (18) to one another so that the bearing surface (14) of the bearing portion (10) contacts the side surface (15) of the second electrical conductor (3) and the first fastening means (17), or the second fastening means (18), radially enlarges/spreads apart the press portion (9) of the electrical connection element (8) which creates the non-positive connection between at least one lateral contact surface (11) of the radially enlarged/spread apart press portion (9) and an inner lateral surface (12) of the contact recess (13) of the first electrical conductor (2); and providing a rotationally fixed interconnection by at least one of, providing a mechanical interface (26) that rotationally fixes the interconnection of the electrical connection element (8) to the first electrical conductor (2), or to the second electrical conductor (3), or configuring the press portion (9) of the electrical connection element (8) to receive the first fastening means (17) in a rotationally fixed manner.

A further object of the present invention is an electrical connection arrangement (4) and further comprising: plural lateral contact surfaces (11); and the plural lateral contact surfaces (11) are configured as spring tabs of a spring cage.

A still further object of the present invention is an electrical connection arrangement (4) for electrical and mechanical connection of a first electrical conductor (2) to a second electrical conductor (3), the electrical connection arrangement (4) comprising: an electrical connection element (8), having, a first end, that defines a press portion (9), and a second end, that defines a bearing portion (10), the bearing portion (10) having a bearing surface (14), and a connection bore (16) is defined in the electrical connection element (8) and the connection bore (16) extends between the press portion (9) at the first end, and the bearing portion (1) at the second end, and the press portion (9) at the first end has at least one lateral contact surface (11) for electrical contact with an inner lateral surface (12) of a contact recess (13) defined in the first electrical conductor (2), and the bearing surface (14) of the bearing portion (10) provides a non-positive connection to a side surface (15) of the second electrical conductor (3); and a first fastening means (17), and wherein, the first fastening means (17) is separable from the electrical connection element (8) and the first fastening means (17) extends at least partially through the connection bore (16) defined in the electrical connection element (8), or the first fastening means (17) is integral with the electrical connection element (8) and the integral first fastening means (17) defines, at least partially, the connection bore (16); and a second fastening means (18) that extends at least partially through the connection bore (16) defined in the electrical connection element (8) and the second fastening means (18) is connectable with the first fastening means (17); and wherein interconnection of the second fastening means (18) with the first fastening means (17) produces the non-positive connection between the bearing surface (14) of the bearing portion (10) and the side surface (15) of the second electrical conductor (3); and the press portion (9) of the electrical connection element (8) is radially enlarged/spread apart responsive to the connection of the second fastening means (18) with the first fastening means (17); and wherein a non-positive connection between the at least one lateral contact surface (11) of the press portion (9) and the inner lateral surface (12) of the contact recess (13) defined in the first electrical conductor (2) is produced by connection of the second fastening means (18) with the first fastening means (17); and wherein the press portion (9) of the electrical connection element (8) is configured to receive the first fastening means (17) in a rotationally fixed manner.

An even still further object of the present invention is an electrical connection arrangement (4) a wherein the mechanical interface (26) that rotationally fixes the connection is the bearing portion (10) of the electrical Connection element (8).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An electrical connection arrangement (4) for electrical and mechanical connection of a first electrical conductor (2) to a second electrical conductor (3), the electrical connection arrangement (4) comprising:

an electrical connection element (8), having, a first end, that defines a press portion (9), and a second end, that defines a bearing portion (10), the bearing portion (10) having a bearing surface (14), and a connection bore (16) is defined in the electrical connection element (8) and the connection bore (16) extends between the press portion (9) at the first end, and the bearing portion (10) at the second end, and the press portion (9) at the first end has at least one lateral contact surface (11) for electrical contact with an inner lateral surface (12) of a contact recess (13) defined in the first electrical conductor (2), and the bearing surface (14) of the bearing portion (10) provides a non-positive connection to a side surface (15) of the second electrical conductor (3); and a first fastening means (17), and wherein, the first fastening means (17) is separable from the electrical connection element (8) and the first fastening means (17) extends at least partially through the connection bore (16) defined in the electrical connection element (8), or the first fastening means (17) is integral with the electrical connection element (8) and the integral first fastening means (17) defines, at least partially, the connection bore (16); and a second fastening means (18) that extends at least partially through the connection bore (16) defined in the electrical connection element (8) and the second fastening means (18) is connectable with the first fastening means (17); and wherein interconnection of the second fastening means (18) with the first fastening means (17) produces the non-positive connection between the bearing surface (14) of the bearing portion (10) and the side surface (15) of the second electrical conductor (3); and the press portion (9) of the electrical connection element (8) defines plural longitudinal slots to form the at least one lateral contact surface (11) between two of the plural longitudinal slots, and wherein the press portion (9) of the electrical connection element (8) is radially enlarged/spread apart, at the plural longitudinal slots, responsive to the connection of the second fastening means (18) with the first fastening means (17); and wherein a non-positive connection between the at least one lateral contact surface (11) of the press portion (9) and the inner lateral surface (12) of the contact recess (13) defined in the first electrical conductor (2) is produced by connection of the second fastening means (18) with the first fastening means (17).

2. The electrical connection arrangement (4) as claimed in claim 1 and wherein the electrical connection element (8) is sleeve-shaped; and the connection bore (16) extends entirely through the electrical connection element (8).

3. The electrical connection arrangement (4) as claimed in claim 1 and wherein the bearing portion (10) is configured in one piece with the press portion (9).

4. The electrical connection arrangement (4) as claimed in claim 1 and wherein the at least one lateral contact surface (11) has a radially outward convex bulge.

5. The electrical connection arrangement (4) as claimed in claim 1 and wherein, at least one of the separable first fastening means (17), or the integral first fastening means (17), tapers on an outer lateral surface in the direction of the second end of the electrical connection element (8); or the press portion (9) tapers on an inner lateral surface inside the connection bore (16), in the direction of the second end of the electrical connection element (8).

6. The electrical connection arrangement (4) as claimed in claim 1 and wherein the first fastening means (17) defines an internal thread for a threaded connection with the second fastening means (18).

7. The electrical connection arrangement (4) as claimed in claim 1 and wherein the second fastening means (18) has a screw element, the screw element having a screw head (21), and a screw shank (19) that is interconnected with the screw head (21), and the screw head (21) contacts, directly or indirectly, a side surface of the second electrical conductor (3) opposite the bearing surface (14) of the bearing portion (10); and the screw shank (19) can be passed, at least partially, through a fastening recess (20) defined in the second electrical conductor (3) and at least partially through the connection bore (16) defined in the electrical connection element (8), and wherein the screw shank (19) defines an external thread for forming a threaded connection with the first fastening means (17).

8. The electrical connection arrangement (4) as claimed in claim 1 and wherein the first electrical conductor (2) and the second electrical conductor (3), are configured as conductor rails.

9. The electrical connection arrangement (4) as claimed in claim 1 and further comprising:

a fastening recess (20) defined in the second electrical conductor (3); and the second fastening means (18) is passed, at least partially through the fastening recess (20) defined in the second electrical conductor (3); and the fastening recess (20) has a larger cross-sectional extent than the portion of the second fastening means (18) passing through the fastening recess (20), for compensating for mechanical tolerances.

10. A method for producing an electrical and mechanical connection between a first electrical conductor (2) and a second electrical conductor (3) comprising the steps:

providing an electrical connection element (8), the electrical connection element (8) having a first end, that defines a press portion (9), and a second end, that defines a bearing portion (10), the bearing portion (10) having a bearing surface (14), and a connection bore (16) is defined in the electrical connection element (8) and the connection bore (16) extends between the press portion (9) at the first end, and the bearing portion (10) at the second end, and the press portion (9) at the first end has at least one lateral contact surface (11) for electrical contact with an inner lateral surface (12) of a contact recess (13) defined in the first electrical conductor (2), and the bearing surface (14) of the bearing portion (10) provides a non-positive connection to a side surface (15) of the second electrical conductor (3); and a first fastening means (17) that extends at least partially through the connection bore (16) defined in the electrical connection element (8); and a second fastening means (18) that extends at least partially through the connection bore (16) defined in the electrical connection element (8) and the second fastening means (18) is connectable with the first fastening means (17); and wherein interconnection of the second fastening means (18) with the first fastening means (17) produces the non-positive connection between the bearing surface (14) of the bearing portion (10) and the side surface (15) of the second electrical conductor (3); and wherein the press portion (9) defines plural longitudinal slots to form the at least one lateral contact surface (11) between two of the plural longitudinal slots; and wherein the press portion (9) of the electrical connection element (8) is radially enlarged/spread apart, at the plural longitudinal slots, responsive to connection of the second fastening means (18) with the first fastening means (17); and wherein a non-positive connection between the at least one lateral contact surface (11) of the press portion (9) and the inner lateral surface (12) of the contact recess (13) defined in the first electrical conductor (2) is produced by connection of the second fastening means (18) with the first fastening means (17); and positioning the electrical connection element (8) between the first electrical conductor (2) and the second electrical conductor (3); and introducing the first fastening means (17) into the connection bore (16); and introducing the second fastening means (18) into the connection bore (16); and connecting the first fastening means (17) and the second fastening means (18) to one another so that the bearing surface (14) of the bearing portion (10) contacts the side surface (15) of the second electrical conductor (3) and the first fastening means (17), or the second fastening means (18), radially enlarges/spreads apart the press portion (9) of the electrical connection element (8) at the plural longitudinal slots which creates the non-positive connection between the at least one lateral contact surface (11) of the radially enlarged/spread apart press portion (9) and the inner lateral surface (12) of the contact recess (13) of the first electrical conductor (2).

11. The electrical connection arrangement (4) as claimed in claim 1 and further comprising:

plural lateral contact surfaces (11); and the plural lateral contact surfaces (11) are configured as spring tabs of a spring cage.

12. An electrical connection arrangement (4) for electrical and mechanical connection of a first electrical conductor (2) to a second electrical conductor (3), the electrical connection arrangement (4) comprising:

an electrical connection element (8), having, a first end, that defines a press portion (9), and a second end, that defines a bearing portion (10), the bearing portion (10) having a bearing surface (14), and a connection bore (16) is defined in the electrical connection element (8) and the connection bore (16) extends between the press portion (9) at the first end, and the bearing portion (1) at the second end, and the press portion (9) at the first end has at least one lateral contact surface (11) for electrical contact with an inner lateral surface (12) of a contact recess (13) defined in the first electrical conductor (2), and the bearing surface (14) of the bearing portion (10) provides a non-positive connection to a side surface (15) of the second electrical conductor (3); and a first fastening means (17), and wherein, the first fastening means (17) is separable from the electrical connection element (8) and the first fastening means (17) extends at least partially through the connection bore (16) defined in the electrical connection element (8), or the first fastening means (17) is integral with the electrical connection element (8) and the integral first fastening means (17) defines, at least partially, the connection bore (16); and a second fastening means (18) that extends at least partially through the connection bore (16) defined in the electrical connection element (8) and the second fastening means (18) is connectable with the first fastening means (17); and wherein interconnection of the second fastening means (18) with the first fastening means (17) produces the non-positive connection between the bearing surface (14) of the bearing portion (10) and the side surface (15) of the second electrical conductor (3); and the press portion (9) of the electrical connection element (8) is radially enlarged/spread apart responsive to the connection of the second fastening means (18) with the first fastening means (17); and wherein a non-positive connection between the at least one lateral contact surface (11) of the press portion (9) and the inner lateral surface (12) of the contact recess (13) defined in the first electrical conductor (2) is produced by connection of the second fastening means (18) with the first fastening means (17); and wherein the press portion (9) of the electrical connection element (8) is configured to receive the first fastening means (17) in a rotationally fixed manner; and wherein the press portion (9) defines a non-circular geometry inside the connection bore (16) which engages with, and interlocks with, a corresponding external non-circular geometry of the first fastening means (17) so as to provide a positive non-rotatable connection therebetween, which is based on interlocking shapes instead of a purely friction-based connection.

13. The electrical connection arrangement (4) as claimed in claim 1 and wherein the mechanical interface (26) that rotationally fixes the connection is the bearing portion (10) of the electrical connection element (8).

14. The electrical connection arrangement (4) as claimed in claim 1 and wherein the mechanical interface (26) has at least one linear/non-curved surface/section that prevents rotation of the electrical connection element (8) relative to the respective electrical conductor (2), (3).

15. The electrical connection arrangement (4) as claimed in claim 1 and further comprising:

a housing shell (25); and wherein the rotationally fixed connection to the first electrical conductor (2) or the rotationally fixed connection to the second electrical conductor (3) is provided via cooperating surfaces between the housing shell (25) and the mechanical interface (26).

* * * * *